(12) United States Patent
Omi et al.

(10) Patent No.: US 6,418,373 B1
(45) Date of Patent: Jul. 9, 2002

(54) NAVIGATION SYSTEM HAVING TRAVEL PATH REPLACING FUNCTION (75) Inventors: Masanori Omi, Gifu; Toshihiro Ito, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/649,820

(22) Filed: Aug. 28, 2000

(30) Foreign Application Priority Data

Oct. 29, 1999 (JP) .............................................. 11-309619

(51) Int. Cl.[7] .......................... G08G 1/09; G01C 21/00
(52) U.S. Cl. ....................... 701/209; 701/202; 701/211; 340/990; 340/995
(58) Field of Search ................................. 701/209, 210, 701/211, 202, 201; 340/990, 995

(56) References Cited

U.S. PATENT DOCUMENTS

| | | | | |
|---|---|---|---|---|
| 5,184,303 A | * | 2/1993 | Link ............................ | 701/200 |
| 5,243,528 A | * | 9/1993 | Lefebvre ..................... | 701/211 |
| 5,550,538 A | * | 8/1996 | Fujii et al. ................... | 340/995 |
| 5,659,476 A | * | 8/1997 | Lefebvre et al. ............. | 701/210 |
| 5,757,289 A | * | 5/1998 | Nimura et al. ............... | 340/995 |
| 5,911,775 A | * | 6/1999 | Tanimoto ...................... | 701/210 |
| 5,928,307 A | | 7/1999 | Oshizawa et al. ........... | 701/210 |

FOREIGN PATENT DOCUMENTS

JP          9-159476         6/1997

* cited by examiner

*Primary Examiner*—Tan Nguyen
(74) *Attorney, Agent, or Firm*—Law Offices of David G. Posz (57) ABSTRACT

In a vehicle navigation system, an initial recommended travel path between a departure point and a destination is determined using the Dijikstra method. If an external memory stores path information regarding a short-cut path that has its start point and end point on the recommended travel path, a corresponding part of the recommended travel path is replaced with the short-cut path to guide the vehicle along the modified recommended travel path. If the vehicle travels deviating from the recommended travel path, path information that specify the leaving path are collected and stored as a new short-cut path in the external memory. If the same travel path is searched for next time, the short-cut path thus stored is used to modify the recommended travel path.

18 Claims, 13 Drawing Sheets

NAVIGATION SYSTEM HAVING TRAVEL PATH REPLACING FUNCTION

CROSS REFERENCE TO RELATED APPLICATION

This application relates to and incorporates herein by reference Japanese Patent Application No. 11-309619 filed on Oct. 29, 1999.

BACKGROUND OF THE INVENTION

1. Field of the Invention

The present invention relates to a navigation system that searches for a recommended travel path between a departure point and a destination and guides a vehicle along the recommended travel path.

2. Related Art

Conventional navigation systems detect the present position of a vehicle from GPS (global positioning system) signals, and display it on a display device. The navigation systems also search for a recommended travel path from a departure point to a destination, and display it on the display device. The recommended travel path may be determined by using Dijikstra method or similar methods. In this method, each path connecting two nodes is evaluated with respect to required travel cost by referring to road map data and link information stored in a memory device such as a CD-ROM or a DVD. The recommended travel path is determined by connecting links that will require a minimum cost in total, after all the links from the departure point to the destination are evaluated.

The above method sometimes fails to provide a travel path most favorable to vehicle drivers. This is because not all the available roads are stored in the memory device. Further, the drivers sometimes prefer short-cut roads or less crowded roads even though those roads may be narrow or a detour.

SUMMARY OF THE INVENTION

It is therefore an object of the present invention to provide a navigation system that is capable of providing a recommended travel path as drivers desire.

According to the present invention, a navigation system searches a recommended travel path from a departure point to a destination, and collects path information of a leaving path that is taken deviating from the recommended travel path in the course of traveling along the recommended travel path so that the leaving path is learned. The system replaces a part of the recommended travel path with the learned leaving path when the leaving path starts and ends at the recommended travel path, so that the recommended travel path is modified to include the leaving path therein when the same departure point and the destination are input next time.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be described in detail with reference to various embodiments in which the same or similar parts and functions are designated with the same or similar reference numerals.

(First Embodiment)

Figure 1:
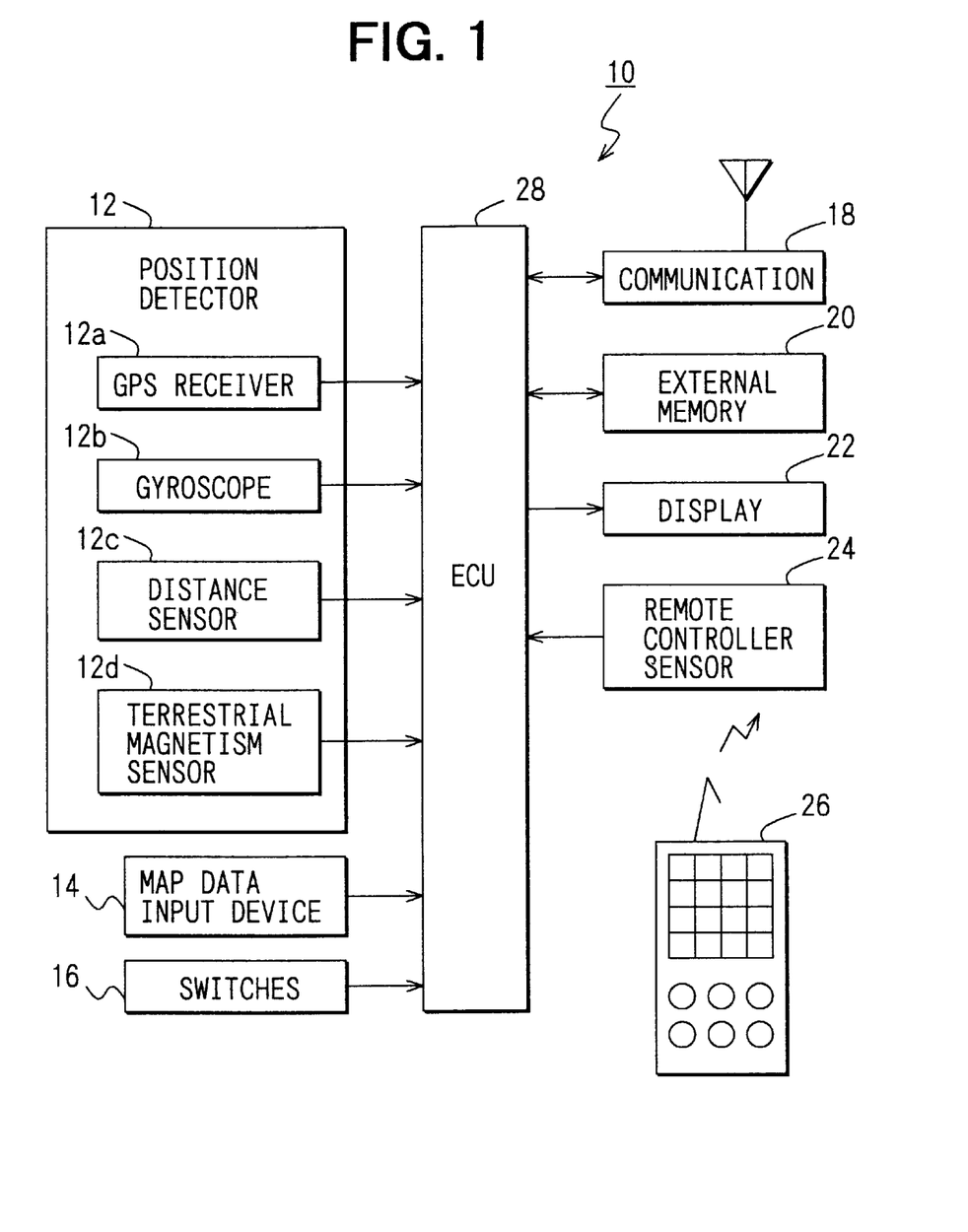
FIG. 1 is a block diagram showing a navigation system according to a first embodiment of the present invention.

Referring first to FIG. 1, a navigation system 10 is mounted in a vehicle (not shown). It comprises a position detector 12, a map data input device 14, manually operable switches 14, a communication device 18, an external memory 20, a display device 22, a remote controller sensor 24, a remote controller 26 and an electronic control unit (ECU) 28. The position detector 12 is for detecting a present position of the vehicle and inputting the detected position data to the ECU 28. The input device 14 is for inputting road map data stored in a memory to the ECU 28. The switches 16 are for manually inputting various instructions to the ECU 28.

The communication device 18 is for transmitting and receiving radio signals for communication with external systems such as a VICS system and inputting received data to the ECU 28. The external memory 20 is backed up with a storage battery to store various data even when a power supply to the navigation system 10 is turned off. The display device 22 displays thereon the present position on a road map along with various other information. The controller sensor 24 is for receiving and inputting to the ECU 28 various instructions transmitted from the remote controller 26. The ECU 28 is for executing predetermined vehicle navigation processing in response to input data received from the position detector 12, the input device 14, switches 16 and the controller sensor 24, and for driving the communication device 18, the external memory 20 and the display device 22 based on the navigation processing results.

The position detector 12 includes a GPS receiver 12a, a gyroscope 12b, a distance sensor 12c and a terrestrial magnetism sensor 12. The GPS receiver 12 is for receiving GPS signals from GPS satellites and detecting the present position, direction and speed of the vehicle. The gyroscope 12b is for detecting rotational motion applied to the vehicle. The distance sensor 12c is for detecting a travel distance of the vehicle by the use of speed sensors and wheel sensors. The magnetism sensor 12d is for detecting absolute direction of the vehicle based on the terrestrial magnetism. Because those devices 12a to 12d have respective detection errors of different nature, the present position may be calculated based on outputs of some devices while compensating for the calculation error by using outputs of the other devices.

The input device 3 inputs various information such as the road map data including connection of roads and map matching data for enhancing the accuracy of position detection. Those data are stored in a memory such as a CD-ROM, DVD-ROM or semiconductor memory card. The road map data are represented by nodes set in correspondence with intersections of roads, and links connecting the nodes. Each link is identified by a link ID. The type, width the number of lanes of a road are stored in correspondence with each link. The external memory 20 stores path information of paths such as short-cut paths which are actually taken.

The paths such as a short-cut path designated as SC path is defined as a deviating or leaving path which a vehicle actually travels in place of the recommended travel path set by the path searching processing. The SC path starts from a point where the vehicle leaves the recommended travel path and ends at a point where the vehicle returns to the original recommended travel path.

Figure 2A:
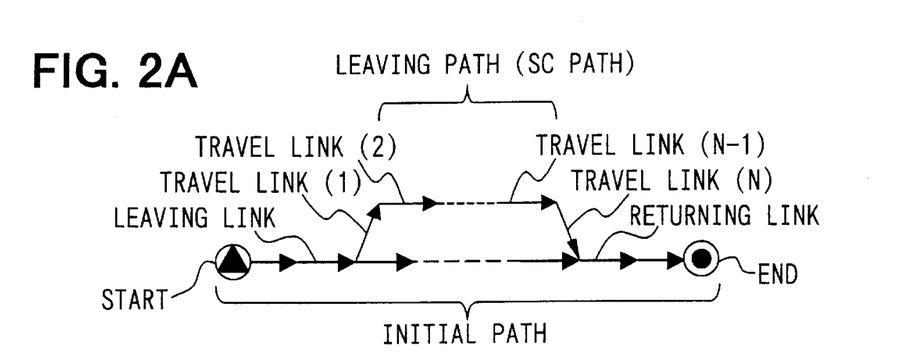
FIGS. 2A to 2C are schematic diagrams showing short-cut paths and related information used in the first embodiment.

Specifically, as shown in FIG. 2A, a leaving link is defined as the last link of the recommended travel path that the vehicle travels before leaving from the recommended travel path, and a returning link is defined as the first link of the recommended travel path that the vehicle travels after returning to the recommended travel path from the leaving path. The SC path is thus defined by a series of travel links (1) to (N) which the vehicle actually travels between the leaving link and the returning link.

Figure 2B:
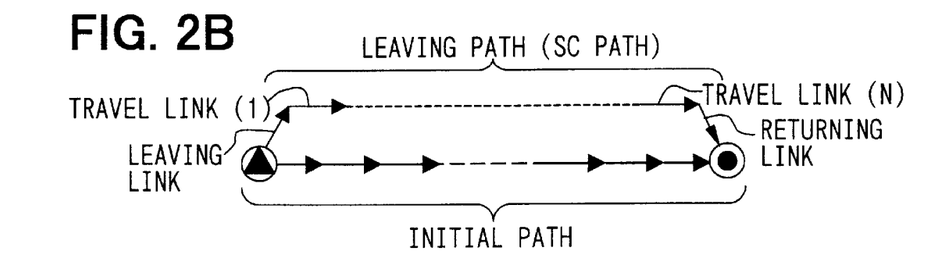

However, in some cases such as shown in FIG. 2B, the vehicle will not travel any recommended travel path from a point of departure to a destination but travel all the way only along the SC path, or the vehicle will arrive at the destination without returning to the recommended travel path. In those instances, the first link and the last link of the SC path are defined as the leaving link and the returning link, respectively.

Figure 2C:
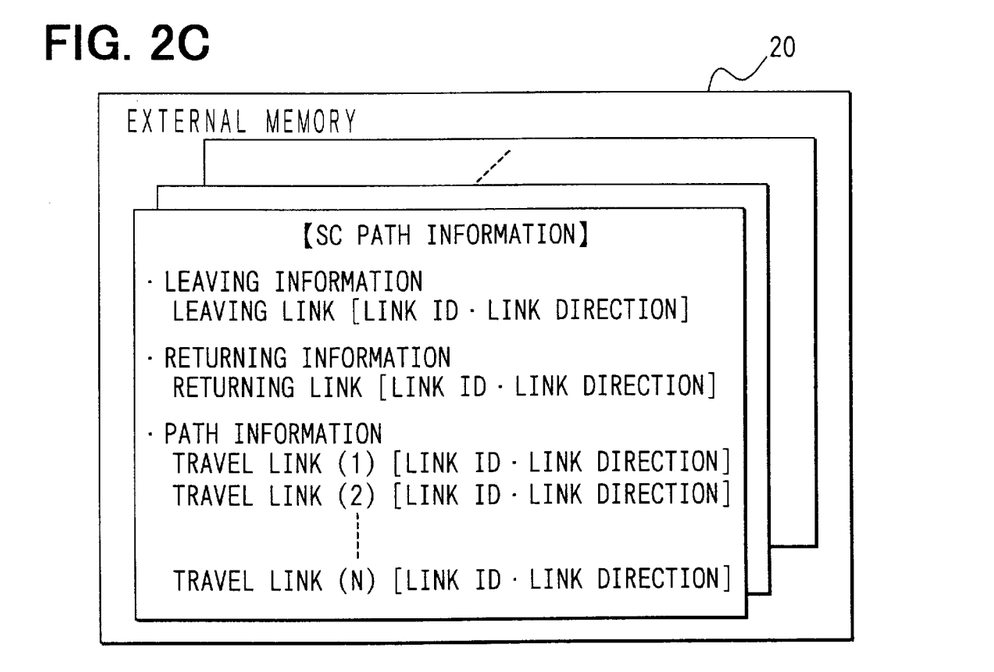

The external memory 20 stores therein SC path information with respect to each SC path as shown in FIG. 2C. The SC path information comprises leaving information indicative of the leaving link, returning information indicative of the returning link, and route information indicative of the travel links. The leaving information includes an ID and direction of the leaving link to specify the point of leaving, that is, the start of the SC path. The returning information includes an ID and direction of the returning link to specify the point of returning, that is, the end of the SC path. The route information includes an ID and direction of each of the travel links to specify all the travel links (1) to (N) between the start and the end of the SC path.

The ECU 28 is constructed with a microcomputer including a CPu, a ROM, a RAM and the like. It is programmed to execute display processing to receive data from the position detector 12 and the input device 14 and drives the display device 22 for displaying the present position on a road map around the present position. It is also programmed to execute navigation processing to automatically search for the recommended travel path from the point of departure to the destination for guiding the vehicle travel, when the destination is input from the switches 16 or the remote controller 26 by the driver.

Figure 3:
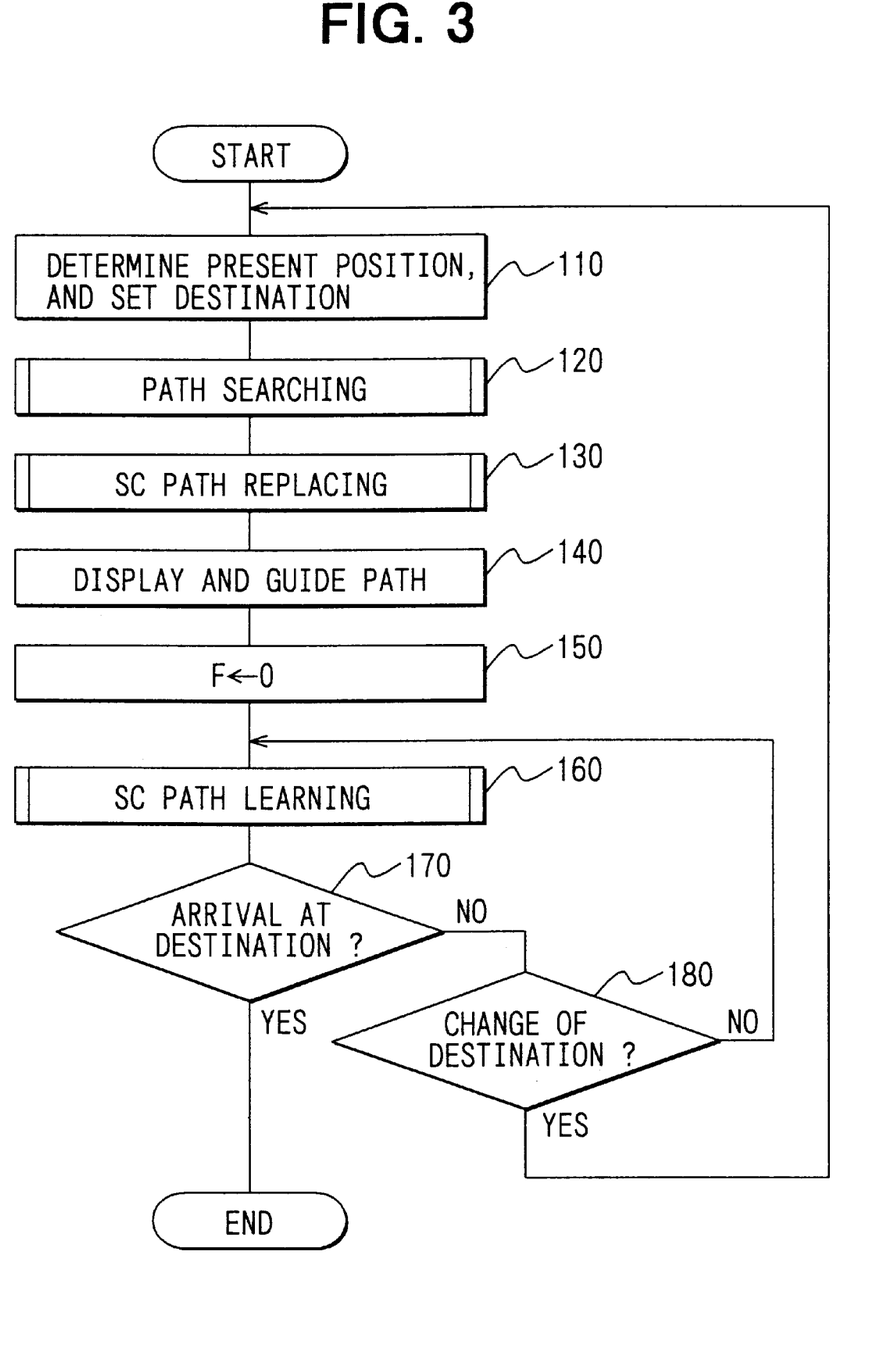
FIG. 3 is a flow diagram showing a navigation processing executed in the first embodiment.

The ECU 28 executes the navigation processing as shown in FIG. 3. When this processing is initiated, at step 110, the present position of the vehicle is determined from the data received from the position detector 12, and this present position is set as the departure point. The destination is set from the data received from the switches 16 or the remote controller 26. The destination may be selected from a list of combination of facilities and required travel times displayed on the display device 22.

At step 120, a path searching is executed to search for an initial recommended travel path between the departure point and the destination. The path searching may be attained based on the known method such as Dijikstra method. Then, at step 130, an SC path replacing is executed. In this processing, the SC path information stored in the external memory is checked to search for the SC path that has its start point and end point on the initial recommended travel path. If there is such an SC path, a corresponding part of the initial recommended travel path is replaced with the SC path to finalize the recommended travel path.

Figure 4:
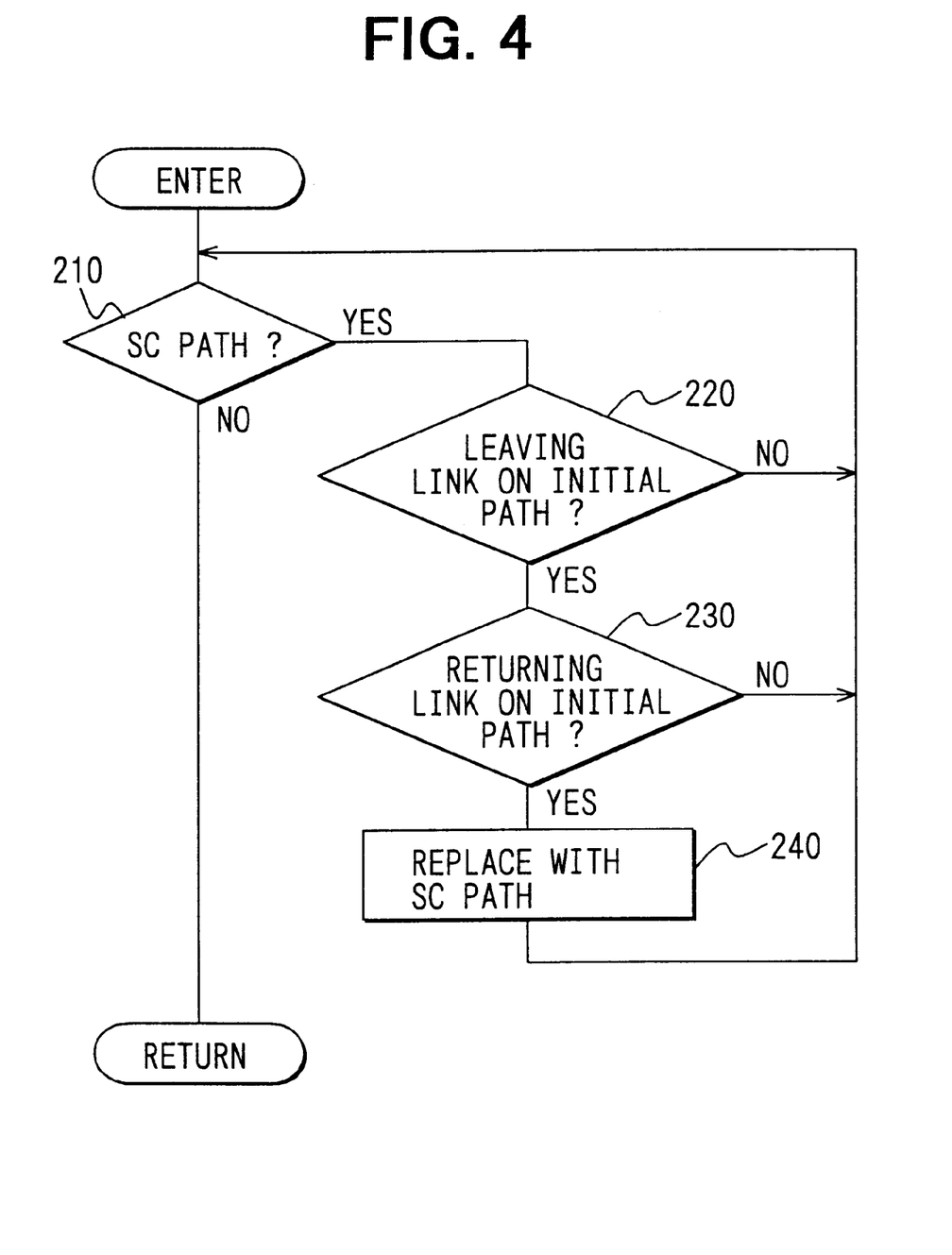
FIG. 4 is a flow diagram showing a short-cut path replacing processing executed in the navigation processing in the first embodiment.

The ECU 28 executes the SC path replacing processing (step 120) as shown in FIG. 4. First at step 210, the external memory 20 is checked for the SC path that is close to the initial recommended travel path. If there is (YES), the SC path is checked with reference to the stored path information at step 220 whether its leaving link is on the initial recommended travel path. If it is so (YES), the SC path is further checked with reference to the stored path information at step 230 whether its returning link is on the initial recommended travel path.

Figure 5A:
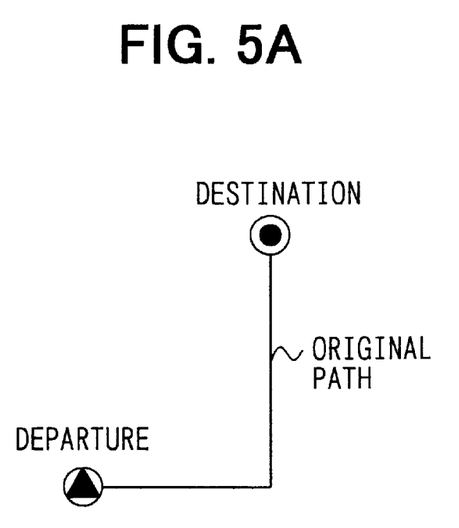
FIGS. 5A to 5C are schematic diagrams showing a sequence of replacing an original path with the short-cut path in the first embodiment.
Figure 5B:
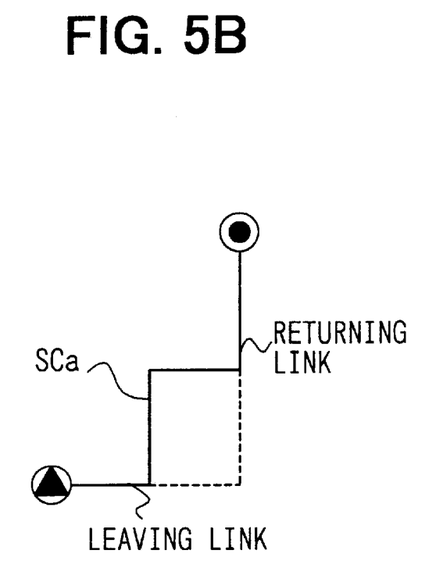

If it is so (YES), that is, if both the leaving link and the returning link of the SC path are on the initial recommended travel path shown in FIG. 5A, a part of the initial recommended travel path between the leaving path and the returning path is replaced with this SC path SCa at step 240 as shown in FIG. 5B. That is, a part of the initial recommended travel path starting immediately following the leaving path and ending immediately preceding the returning path are deleted as shown by a dotted line, and the SC path SCa is inserted therefor.

Figure 5C:
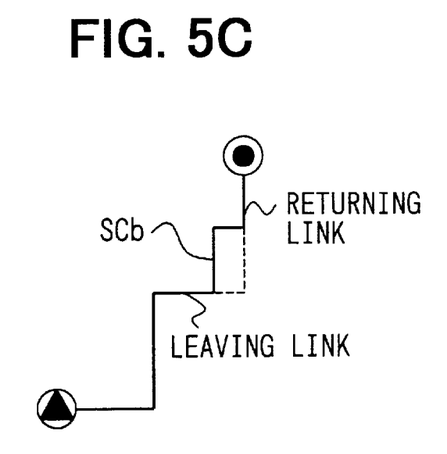

After the above sequence of steps 210 to 240 with respect to one SC path Sa, the same sequence is repeated with respect to each SC path. In this instance, particularly at step 210, the modified initial recommended travel path shown in FIG. 5B is used as the initial recommended travel path. As a result, a SC path SCb that has its start point or end point on the initial recommended travel path before modified or after modified is checked at steps 220 to 230. Through a repetition of the above steps 210 to 240, the initial recommended travel path shown in FIG. 5A is modified by the use of SC paths SCa and SCb, thus finalizing the recommended travel path as shown in FIG. 5C.

After the SC path searching and replacing, at step 140, the display unit 22 is driven to display the recommended travel path as finalized above and guide the vehicle along the recommended travel path. Then at step 150, a leaving flag F is reset to 0 that indicates the recommended travel path. If the vehicle travels a path leaving and deviating from the recommended travel path, a new SC path is learned at step 160.

It is checked at step 170 whether the vehicle arrived at the destination. If not yet arrived (NO), it is further checked at step 180 whether the destination was changed by manipulation of the switches 16 or the remote controller 26. If not changed (NO), the SC path learning at step 160 is continued. If changed (YES), on the other hand, the above navigation processing is repeated from step 110 to set and display the new recommended travel path to the newly input destination.

Figure 6:
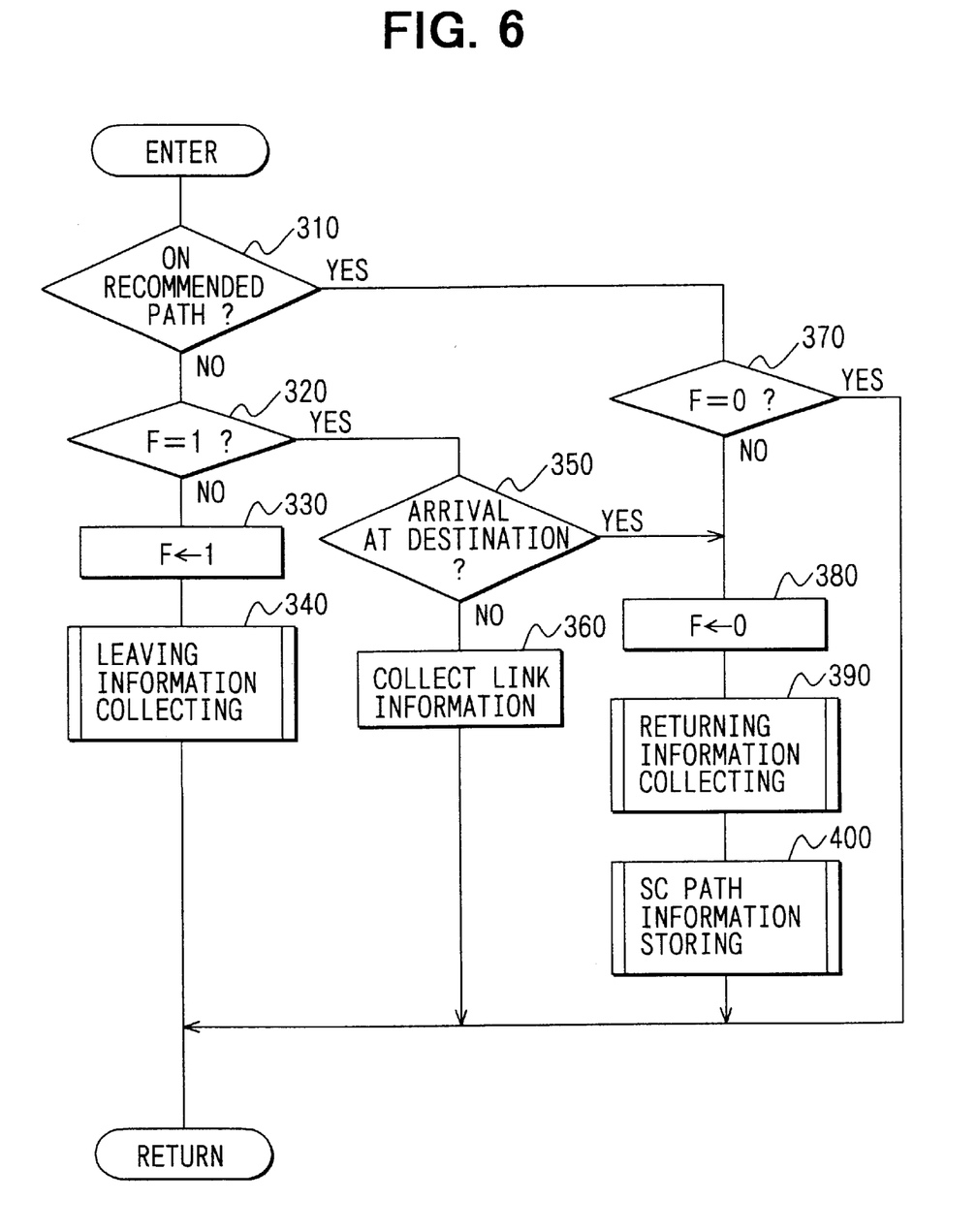
FIG. 6 is a flow diagram showing a short-cut path learning processing executed in the first embodiment.

The ECU 28 executes the SC path learning processing step 160) as shown in FIG. 6. It is first checked at step 310 whether the present vehicle position is on the recommended travel path. If it is deviated (NO), it is checked at step 320 whether the flag F is 1 that indicates the SC path. If the flag F is not 1 (NO), that is, if the vehicle has just left the recommended travel path, it is set to 1 at step 330 to start collecting the information regarding the leaving link of the recommended travel path.

Figure 7A:
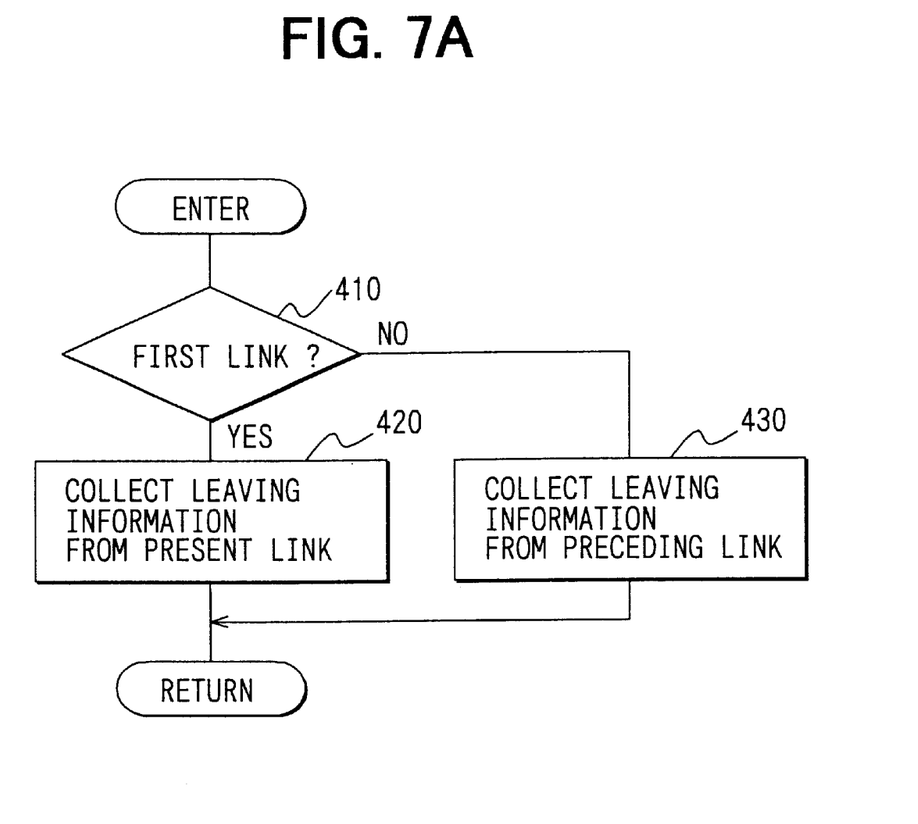
FIGS. 7A and 7B are flow diagrams showing a leaving information collecting processing and a returning information collecting processing executed in the first embodiment, respectively.

In this leaving information collecting processing (step 340), as shown in FIG. 7A, it is first checked at step 410 whether the present position is on the first link of the recommended path, that is, whether the vehicle is deviating from the recommended travel path immediately from the departure point. If it is on the first link (YES), the present link is determined to be the leaving link at step 420. Specifically, the ID and direction of the present link are collected or determined as the leaving information. If the present position is not the first link (NO), on the other hand, it is determined that the vehicle was traveling along the recommended travel path until then. In this instance, the immediately preceding link is determined to be the leaving link at step 430. Specifically, the ID an direction of the immediately preceding link are collected as the leaving information.

If the flag F is 1 (YES at step 320 in FIG. 6), it is further checked at step 350 whether the vehicle arrived at the destination. If not yet arrived (NO), the present link is determined as the travel link and the ID and direction of this travel link are collected as the link information at step 360.

If the vehicle is on the recommended travel path (YES at step 310), it is further checked at step 370 whether the flag F is 0. If it is 0 (YES), it is determined that the vehicle is continuing a travel on the recommended travel path. If it is not 0 (NO), it is determined that the vehicle just returned to the recommended travel path from the SC path. In this instance, the flag F is reset to 0 at step 380 that indicates the recommended travel path.

Then, the ECU 28 executes returning information collecting processing at step 390 to retrieve information regarding the returning link. The ECU 28 further executes SC path information storing processing at step 400 to store, as path information of a new SC path in the external memory 20, the leaving information collected at step 340, the link information collected at step 360 and the returning information collected at step 390.

Figure 7B:
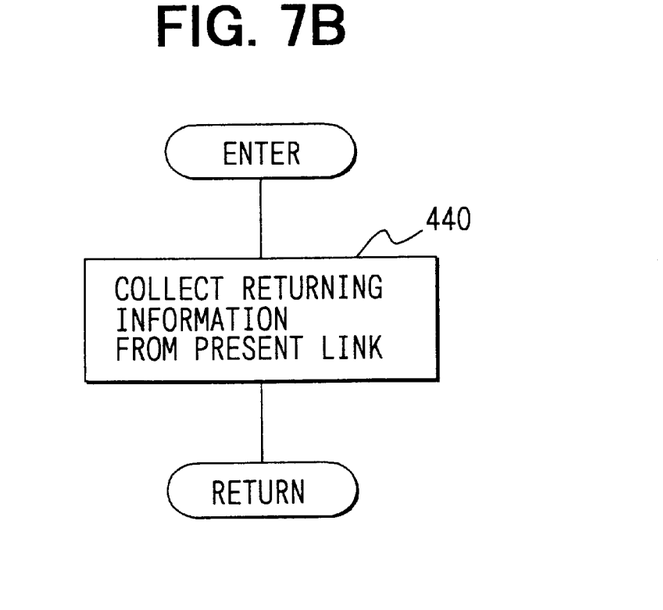

In the returning information collecting processing (step 390), as shown in FIG. 7B, the present link is determined as the returning link, and the ID and direction of this link are collected as the returning information at step 440. It is to be noted that present link that is used to define the returning link at step 390 differs from each other depending on the check results of steps 350 and 370. That is, the returning link is determined from the link on the SC path in the case of YES at step 350, and from the link on the recommended travel path in the case of NO at step 370.

In the SC path information storing processing (step 400), if the external memory 20 already has the path information regarding the collected SC path, the previously existing path information may be updated with the newly collected path information. If the external memory 20 has no path information regarding the collected SC path, the collected SC path information is added in the external memory 20. If the external memory runs short of its storage areas due to accumulation of SC path information, newly collected path information may be stored by deleting the older one, that is, by overwriting the new one on the oldest one.

As described above, according to the first embodiment, if the vehicle travels a path deviating from the recommended travel path, such a leaving path is learned and stored as a SC path so that the stored SC path may be used when the recommended travel path is searched for the next time. As a result, the SC paths that the driver often takes or prefers may be reflected instantly and automatically. Further, the SC paths may be reflected in searching for the recommended travel path even if such SC paths are not subjected to the recommended travel path searching processing executed normally.

(Second Embodiment)

In a second embodiment, the SC path information further includes a leaving coordinate that corresponds to a coordinate of start point of the SC path, and a returning coordinate that corresponds to a coordinate of end point of the SC path. In connection with this, the first embodiment is modified in the SC path replacing processing (step 130), the leaving information collecting processing (step 340) and returning information collecting processing (step 390).

Figure 8A:
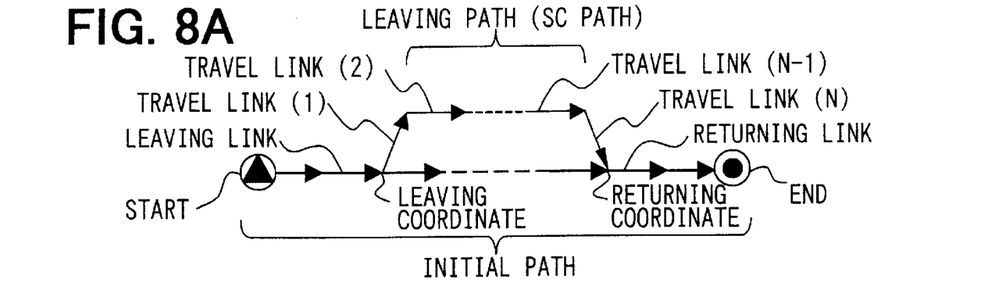
FIGS. 8A to 8C are schematic diagrams showing short-cut paths and related information used in a second embodiment of the present invention.
Figure 8B:
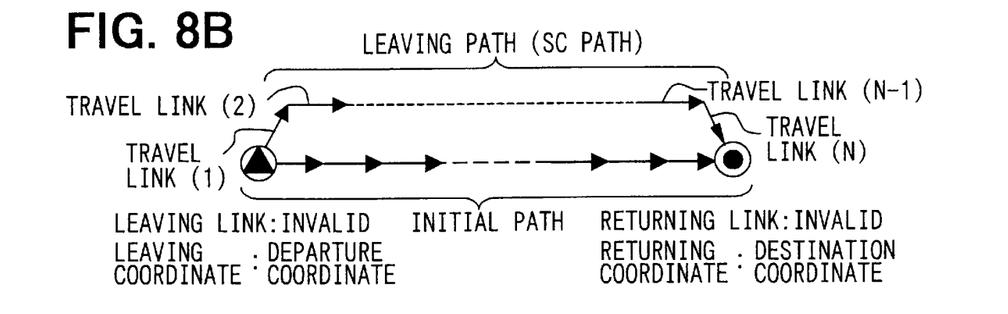
Figure 8C:
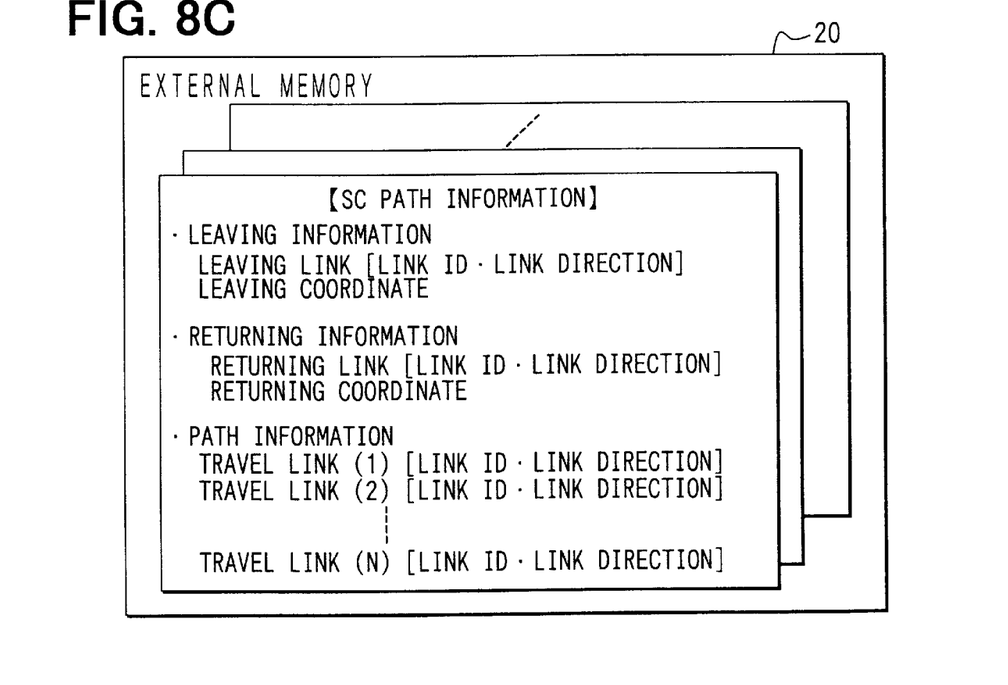

Specifically, as shown in FIG. 8A, the coordinate of the start point (node) of the SC path that is on the recommended path is defined as the leaving coordinate, and the coordinate of the end point (node) of the SC path that is on the recommended path is defined as the returning coordinate. However, in the case that the vehicle deviates from the recommended path immediately after leaving the departure point as shown in FIG. 8B, the coordinate of this departure point is defined as the leaving coordinate. Further, in the case that the vehicle arrives at the destination without returning to the recommended path, the coordinate of the destination is defined as the returning coordinate. The external memory 20 stores, as shown in FIG. 8C, the leaving coordinate as a part of the leaving information and the returning coordinate as a part of the returning information with respect to the SC path information stored for each SC path.

Figure 9A:
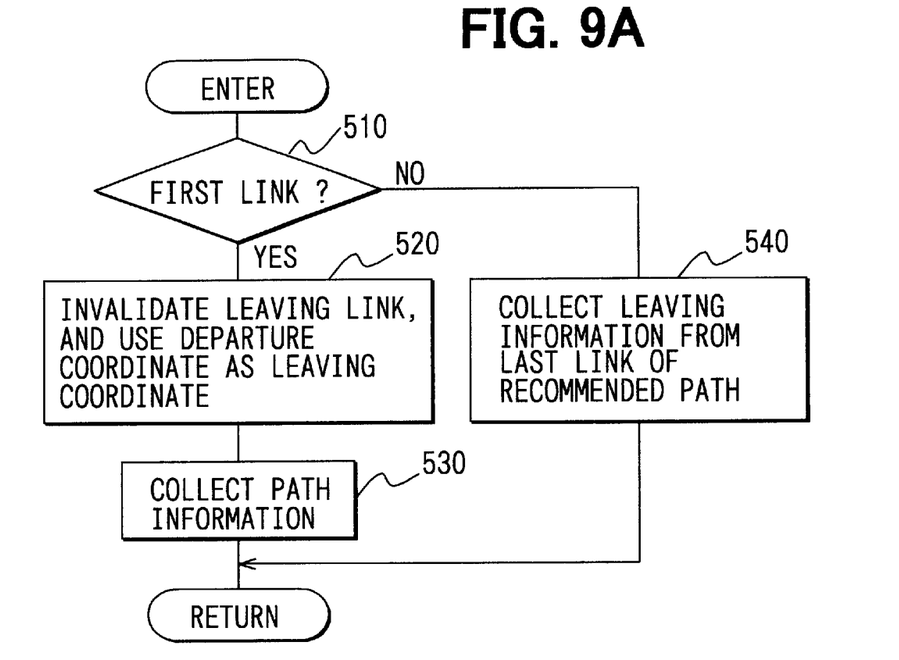
FIGS. 9A and 9B are flow diagrams showing a leaving information collecting processing and a returning information collecting processing executed in the second embodiment, respectively.

In this second embodiment, the ECU 28 executes the leaving information collecting processing as shown in FIG. 9A. It is first checked at step 510 whether the present position is on the first link from the departure point. If it is so (YES), it is determined that the vehicle deviated from the recommended travel path immediately after the departure point without taking the recommended travel path at all. Then, at step 520, the information regarding the leaving link (ID and direction of the link) is invalidated. Further, the coordinate of the departure point is defined as the leaving coordinate, and this coordinate is collected together with the ID and direction of the link as the leaving information. At step 530, the present link is defined as the travel link, and the ID and direction of this link are collected as the route information.

On the other hand, if the present position is not on the first link (NO at step 510), it is determined that the vehicle has been traveling the recommended travel path up to the present position. In this instance, at step 540, the link of the recommended travel path that the vehicle has been traveling is defined as the leaving link, and the leaving coordinate of the node that exists at the end point of the leaving link is collected as the leaving information in addition to the ID and the direction of the leaving link.

Figure 9B:
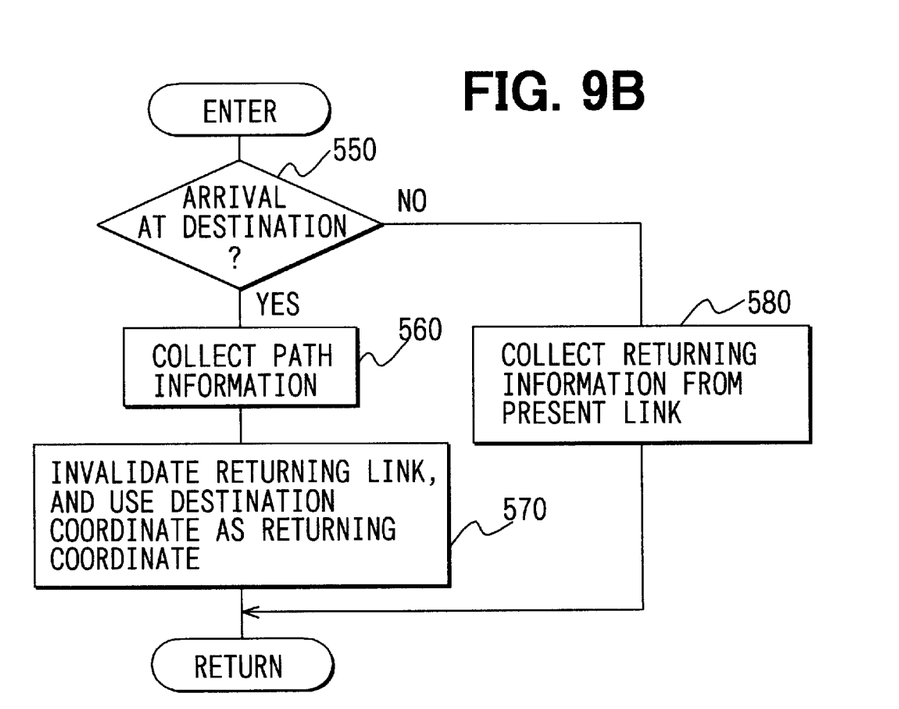

In the returning information collecting processing, as shown in FIG. 9B, it is checked at step 550 whether the vehicle arrived at the destination. If at the destination (YES), it is determined that the vehicle arrived at the destination without returning to the recommended travel path. In this instance, at step 560, the present link is defined as the travel link, and the ID and direction of this link are collected as the path information. Then, at step 570, the information regarding the returning link (ID and direction of the link) is invalidated. Further, the coordinate of the destination is defined as the returning coordinate, and this coordinate is collected as the returning information.

On the other hand, if not at the destination (NOT at step 550), it is determined that the vehicle was traveling the leaving path. In this instance, at step 580, the present link is defined as the returning link, and the returning coordinate of the node that exists at the start point of this returning link is collected as the returning information in addition to the ID and the direction of the returning link.

Figure 10:
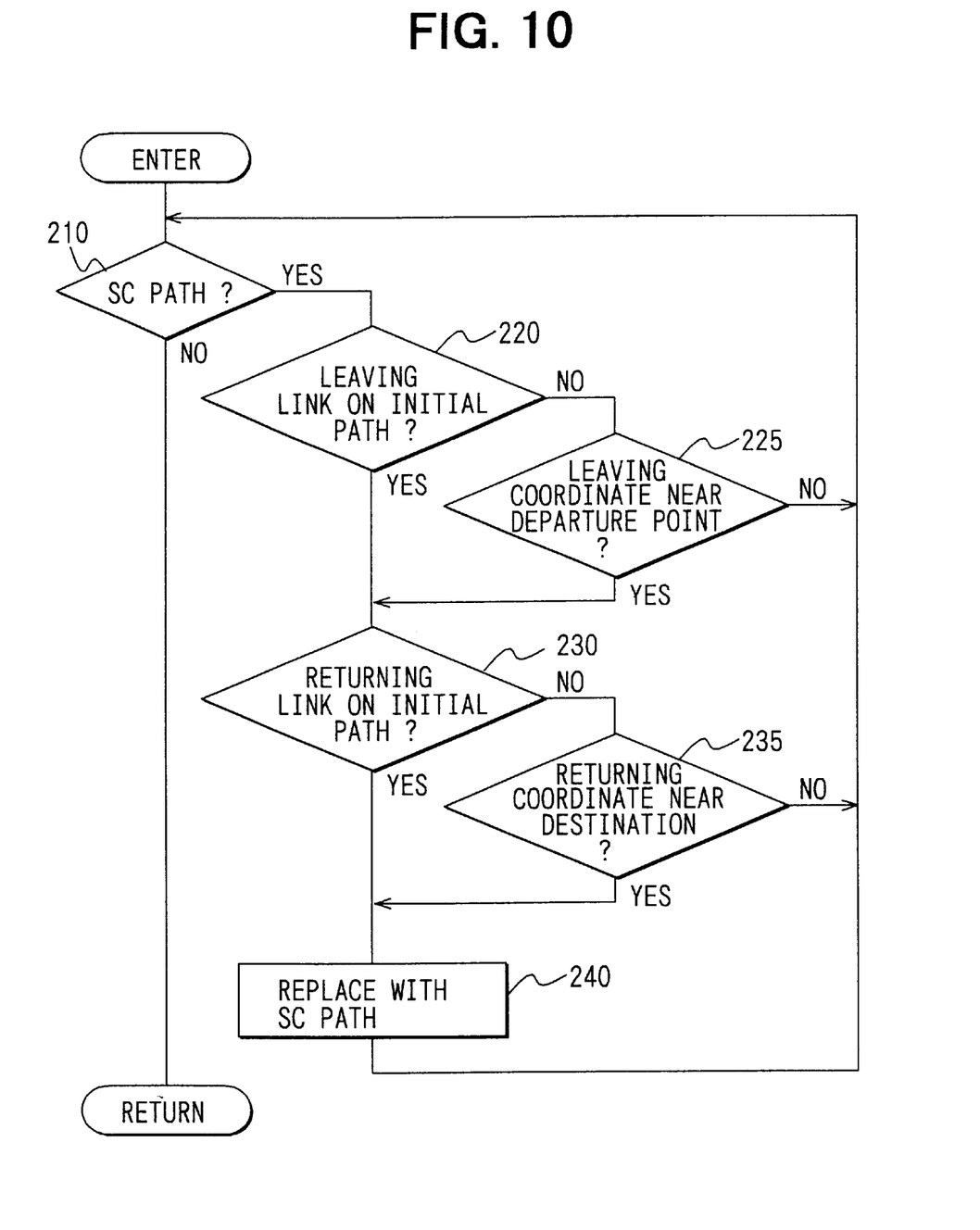
FIG. 10 is a flow diagram showing a short-cut path replacing processing executed in the second embodiment.

The SC path replacing processing of the second embodiment is differentiated from that of the first embodiment (FIG. 4) in the addition of steps 225 and 235 as shown in FIG. 10. In this processing, if no leaving link of the SC path to be checked exists on the initial recommended path (NO at step 220), it is checked at step 225 whether the leaving coordinate of the SC path exists near (for instance, within 50 meters) the departure point. If it exists (YES), step 230 is executed as described above. Further, if no returning link of the SC path to be checked exists on the initial recommended path (NO at step 230), it is checked at step 235 whether the returning coordinate of the SC path exists near (for instance, within 50 meters) the destination. If it exists (YES), step 240 is executed as described above. If neither the leaving coordinate nor returning coordinate exists (NO at steps 225 and 235), the processing returns to step 210.

Figure 11A:
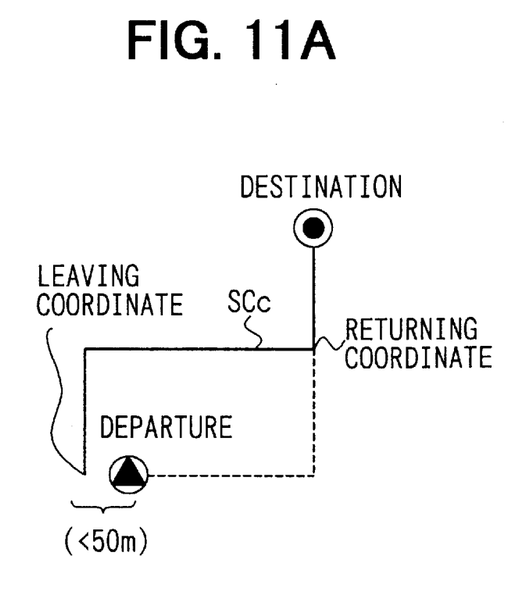
FIGS. 11A to 11C are schematic diagrams showing a sequence of replacing an original path with the short-cut path in the second embodiment.
Figure 11B:
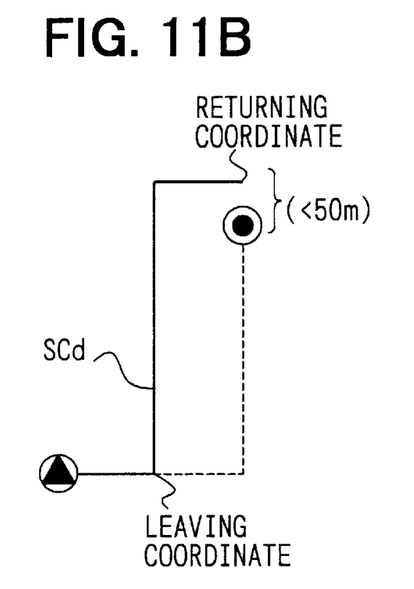
Figure 11C:
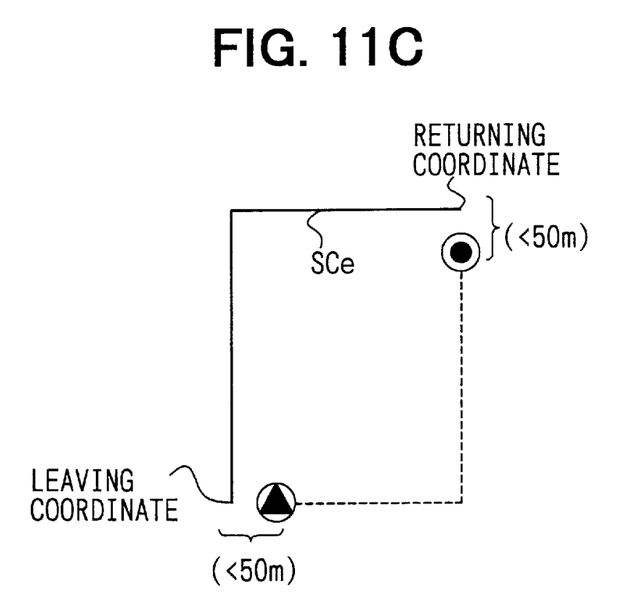

As a result, in addition to the SC path that has the leaving link and the returning link on the recommended travel path, other SC paths SCc, SCd and SCe shown in FIGS. 11A to 11C are also used to replace the initial recommended travel path. These SC paths includes the SC path SCc that has the leaving coordinate near the departure point as shown in FIG. 11A, the SC path SCd that has the returning coordinate near the destination as shown in FIG. 11B, and the SC path SCe that has both the leaving coordinate and the returning coordinate near the departure point and the destination, respectively, as shown in FIG. 11C.

In the second embodiment, the information regarding the leaving link and the returning link may be maintained without invalidating (steps 520 and 570), even when the vehicle leaves the departure point without taking the recommended travel path or the vehicle arrives at the destination without returning to the recommended travel path. In this instance, the leaving coordinate and the returning coordinate are preferably added to the SC path information of the first embodiment.

Further, in the SC path replacing processing, it is possible to search for the SC path information stored in the external memory 20 before executing the path searching processing. In this instance, if the SC path that has the leaving coordinate near the departure point exists, the coordinate of the departure point is preferably replaced with this nearby leaving coordinate. If the SC path that has the returning coordinate near the destination exists, the coordinate of the destination is preferably replaced with this nearby returning coordinate. After this, the path searching processing may be executed.

(Third Embodiment)

Figure 12:
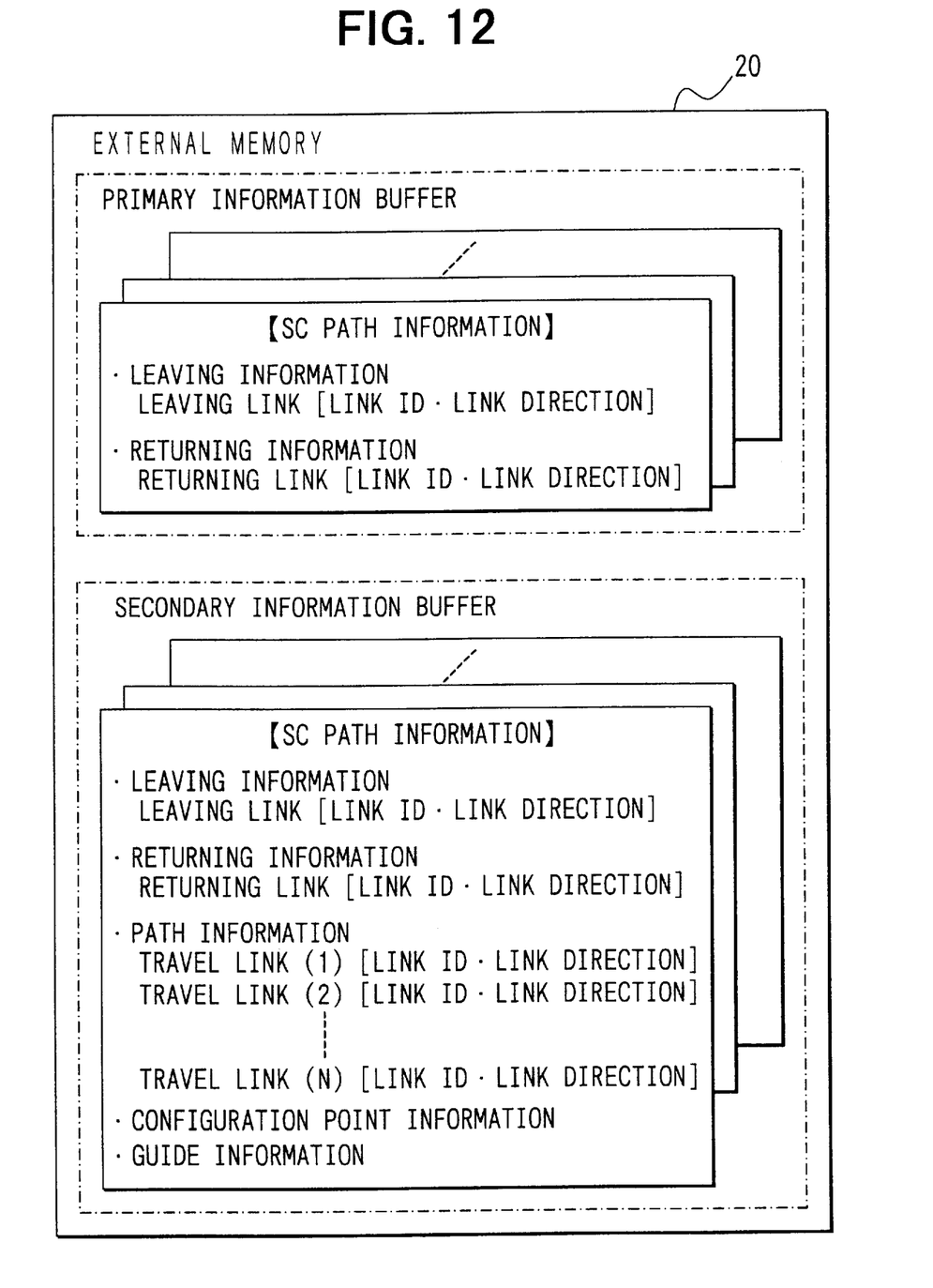
FIG. 12 is a schematic diagram showing a short-cut path information used in a third embodiment of the present invention.
Figure 13:
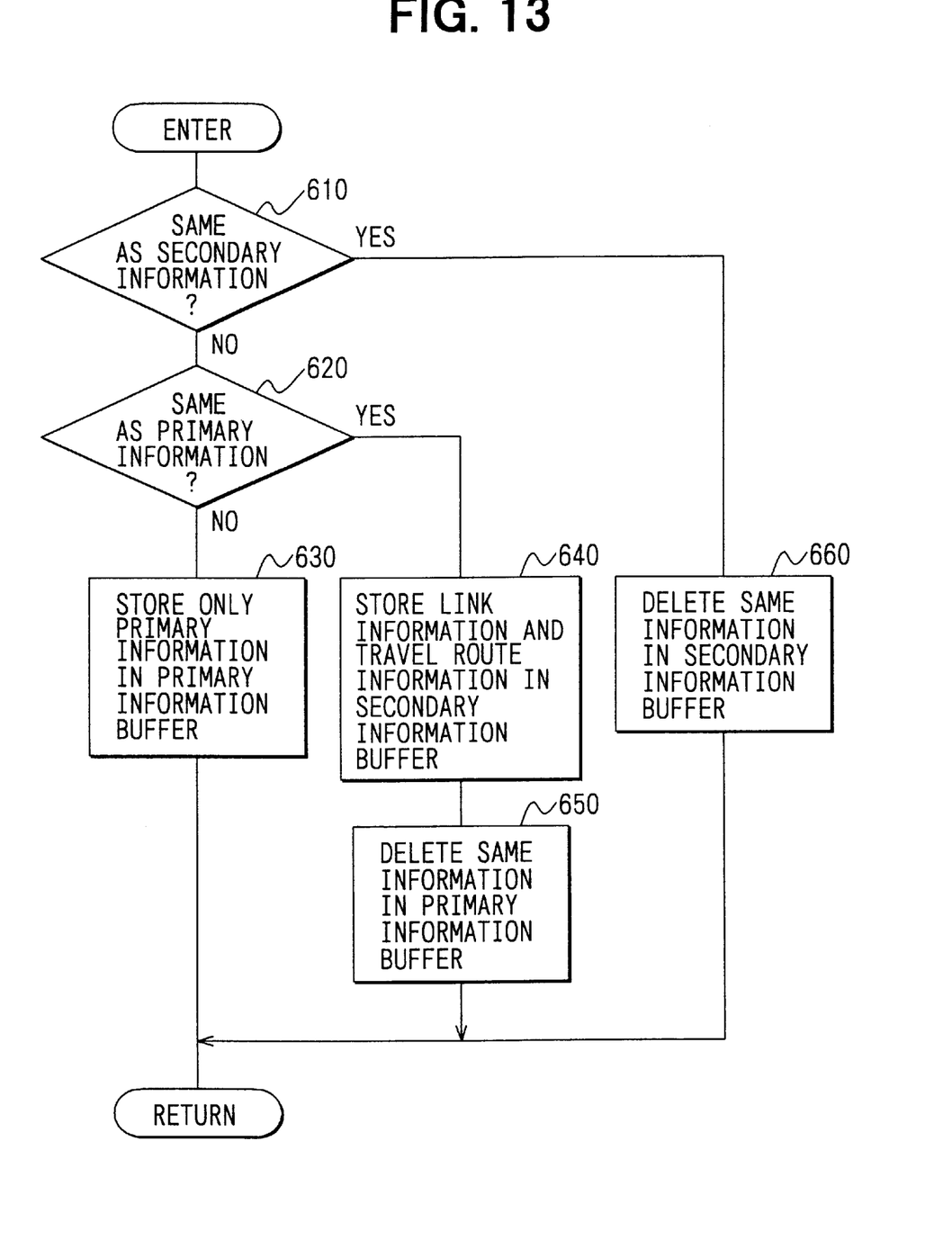
FIG. 13 is a flow diagram showing a short-cut path storing processing executed in the third embodiment.

In a third embodiment, the external memory 20 has a primary information storing area (primary information buffer) and a secondary information storing area (secondary information buffer) as shown in FIG. 12, and the SC path information storing processing is executed differently from the foregoing embodiments (step S400 in FIG. 6) as shown in FIG. 13.

As shown in FIG. 12, the primary information buffer stores primary information that include at least the leaving information (ID and direction of leaving link) and the returning information (ID and direction of returning link) that are required to check for the SC path. The secondary information buffer stores secondary information that include, in addition to the above primary information, route information (ID and direction of travel link), configuration point information and guide information.

The configuration point information is for configuring or drawing on the road map the SC path that is specified by the path information. The guide information is for presenting in speech or the like information regarding the length of the link and noticeable facilities that exist near the link. It is to be noted that only the information in the secondary information buffer are used in the SC path replacing processing (step 130 in FIG. 3).

The ECU 28 executes the SC path information storing processing as shown in FIG. 13 in the third embodiment. It is first checked at step 610 whether the collected path information of the leaving path is the same as the information stored in the secondary information buffer. If not present (NO), it is further checked at step 620 whether the same is present in the primary information buffer. If not present (NO), only the primary information (leaving information and returning information) of the collected path information is stored in the primary information buffer.

If the same collected leaving path information is present in the primary information buffer (YES at step 620), the configuration point information and the guide information are formed based on the collected path information. These information are stored in the secondary information buffer together with the path information at step 640. Then, the same information already in the primary information buffer are deleted from the primary information buffer at step 650.

If the same collected leaving path information is present in the secondary information buffer (YES at step 610), the same collected path information in the secondary information buffer is updated with the newly collected path information at step 660.

It is to be understood in the third embodiment that only the primary information of the SC path that is taken only once and not clear whether it is used again is stored, and the information of the SC path that is taken at least twice is stored as the secondary information in the secondary information buffer. Thus, the storage area of the external memory 20 may be saved and used efficiently.

As the secondary information includes not only the path information but also the configuration point information and the guide information, the SC path may be presented on the display device 22 or in speech in more detailed manner together with the relevant information without forming those relevant information each time it is needed.

In the third embodiment, the configuration point information and the guide information stored as the secondary information in the external memory 20 may be formed when used for the first time in the SC path replacing processing. The secondary information may be limited to the leaving information, returning information and the route information, and the configuration point information and the guide information may be stored as third information. In this instance, only the SC path that has the primary, secondary and the third information may be used in replacing the recommended travel path.

In the foregoing embodiments, if the storage area of the external memory 20 is limited, the information may be deleted from the oldest one, or from the least-frequently collected or replaced one. In the SC path replacing processing, the SC path determined to be used for replacement may be displayed on the road map and may be used for replacement only when the driver select it as a replacement. Further, the SC path replacing processing may be executed only when the driver instructs it through the switches 16 or the remote controller 26.

The present invention should not be limited to the foregoing embodiments and modifications, but may be implemented in many other ways without departing from the spirit of the invention.

What is claimed is:

1. A navigation system comprising:

path searching means for searching a travel path from a departure point to a destination;

guiding means for guiding a recommended travel path based on a search result of the path searching means;

path information collecting means for collecting path information of a leaving path that is taken deviating from the recommended travel path;

path information storing means for storing the path information collected by the collecting means;

path replacing means for replacing a part of the recommended travel path with the leaving path when the leaving path starts and ends at the recommended travel path and the path information is stored in the path information storing means, so that the recommended travel path is modified to include the leaving path therein;

departure point changing means for changing the departure point to a start point of the leaving path, when the start point of the leaving path is within a predetermined distance from the point of departure and stored in the path information storing means; and destination changing means for changing the destination to an end point of the leaving path, when the end point of the leaving path is within a predetermined distance from the destination and stored in the path information storing means.

2. The navigation system as in claim 1, further comprising:

instruction means for instructing whether the path replacing means should execute a path replacing operation.

3. The navigation system as in claim 1, wherein:

the path replacing means replaces the part of the recommended travel path with a leaving path that has a start point and an end point within a predetermined distance from the departure point and the destination.

4. The navigation system as in claim 1, wherein:

the path information storing means stores as leaving path information specifying a start point of the leaving path a last link of the recommended travel path from which the leaving path started; and the path information storing means stores as returning link information specifying an end point of the leaving path a first link of the recommended travel path at which the leaving path ended.

5. The navigation system as in claim 4, wherein:

the path information collecting means uses a first link of the leaving path as a leaving link when deviated from the departure point without taking the recommended travel path; and the path information collecting means uses a last link of the leaving path as a returning link when arrived at the destination without returning to the recommended travel path.

6. The navigation system as in claim 4, wherein:

the path information collecting means uses a departure point coordinate as a start point of the leaving path in place of a leaving link when deviated from the departure point without taking the recommended travel path; and the path information collecting means uses a destination coordinate as an end point of the leaving path in place of a returning link when arrived at the destination without returning to the recommended travel path.

7. The navigation system as in claim 1, wherein:

a start point of the leaving path is defined as a point on the recommended path where deviation starts; and an end point of the leaving path is defined as a point on the recommended path where the deviation ends.

8. A navigation system comprising:

path searching means for searching a travel path from a departure point to a destination;

guiding means for guiding a recommended travel path based on a search result of the path searching means;

path information collecting means for collecting path information of a leaving path that is taken deviating from the recommended travel path;

primary information storing means for storing primary information specifying at least a start point and an end point of the leaving path;

secondary information storing means for storing secondary information specifying at least a passing point in the leaving path in addition to the start point and the end point of the leaving path;

information control means for storing the primary information of the leaving path in the primary information storing means when same information as that collected by the path information collecting means is not stored in the primary information storing means and the secondary information storing means, and for storing the secondary information in the secondary information storing means while deleting the primary information stored in the primary information storing means when the same information as that collected by the path information collecting means is stored in the primary storing means; and path replacing means for replacing a part of the recommended travel path with the leaving path when the leaving path starts and ends at the recommended travel path and the path information of the leaving path is stored in the secondary information storing means, so that the recommended travel path is modified to include the leaving path therein.

9. The navigation system as in claim 8, wherein:

the secondary information includes information for guiding the recommended travel path in speech.

10. The navigation system as in claim 8, wherein:

the secondary information includes information for drawing the leaving path specified by the secondary information on a road map.

11. A navigation system comprising:

path searching means for searching a travel path from a departure point to a destination;

guiding means for guiding a recommended travel path based on a search result of the path searching means;

path information collecting means for collecting path information of a leaving path that is taken deviating from the recommended travel path;

path information storing means for storing the path information collected by the collecting means;

path replacing means for replacing a part of the recommended travel path with the leaving path when the leaving path starts and ends at the recommended travel path and the path information is stored in the path information storing means, so that the recommended travel path is modified to include the leaving path therein;

the path replacing means replaces the part of the recommended travel path with a leaving path that has a start point and an end point within a predetermined distance from the departure point and the destination.

12. The navigation system as in claim 11, further comprising:

instruction means for instructing whether the path replacing means should execute a path replacing operation.

13. The navigation system as in claim 11, wherein the path searching means includes:

departure point changing means for changing the departure point to a start point of the leaving path, when the start point of the leaving path is within a predetermined distance from the point of departure and stored in the path information storing means; and destination changing means for changing the destination to an end point of the leaving path, when the end point of the leaving path is within a predetermined distance from the destination and stored in the path information storing means.

14. The navigation system as in claim 11, wherein:

the path information storing means stores as leaving path information specifying a start point of the leaving path a last link of the recommended travel path from which the leaving path started; and the path information storing means stores as returning link information specifying an end point of the leaving path a first link of the recommended travel path at which the leaving path ended.

15. The navigation system as in claim 14, wherein:

the path information collecting means uses a first link of the leaving path as a leaving link when deviated from the departure point without taking the recommended travel path; and the path information collecting means uses a last link of the leaving path as a returning link when arrived at the destination without returning to the recommended travel path.

16. The navigation system as in claim 14, wherein:

the path information collecting means uses a departure point coordinate as a start point of the leaving path in place of a leaving link when deviated from the departure point without taking the recommended travel path; and the path information collecting means uses a destination coordinate as an end point of the leaving path in place of a returning link when arrived at the destination without returning to the recommended travel path.

17. The navigation system as in claim 11, wherein:

a start point of the leaving path is defined as a point on the recommended path where deviation starts; and an end point of the leaving path is defined as a point on the recommended path where the deviation ends.

18. The navigation system as in claim 11, wherein:

the path information storing means comprises an external memory; and the path replacing means replaces the part of the recommended travel path if a flag in the external memory indicates that the vehicle is not traveling on a travel path for which path replacing means has previously stored path information.

* * * * *